US009840959B2

(12) United States Patent
Davidson

(10) Patent No.: US 9,840,959 B2
(45) Date of Patent: Dec. 12, 2017

(54) HEAT SHIELD ASSEMBLY FOR AN EXHAUST SYSTEM

(71) Applicant: Federal-Mogul Corporation, Southfield, MI (US)

(72) Inventor: Michael Davidson, Ann Arbor, MI (US)

(73) Assignee: Federal-Mogul LLC, Southfield, MI (US)

( * ) Notice: Subject to any disclaimer, the term of this patent is extended or adjusted under 35 U.S.C. 154(b) by 0 days.

(21) Appl. No.: 14/979,416

(22) Filed: Dec. 27, 2015

(65) Prior Publication Data
US 2017/0184007 A1 Jun. 29, 2017

(51) Int. Cl.
F01N 3/00 (2006.01)
F01N 13/14 (2010.01)
B60R 13/08 (2006.01)

(52) U.S. Cl.
CPC ............ *F01N 13/148* (2013.01); *B60R 13/08* (2013.01)

(58) Field of Classification Search
USPC ......... 60/272, 282, 286, 298, 299, 300, 303, 60/320
See application file for complete search history.

(56) References Cited

U.S. PATENT DOCUMENTS

| 3,488,723 A | 1/1970 | Veazie |
| 5,024,289 A | 6/1991 | Merry |
| 5,092,122 A | 3/1992 | Bainbridge |
| 5,134,846 A | 8/1992 | White |
| 5,233,831 A * | 8/1993 | Hitomi ................... F01N 3/2006 123/179.18 |
| 5,419,127 A | 5/1995 | Moore, III |
| 5,477,676 A * | 12/1995 | Benson .................... B64G 1/22 165/96 |
| 5,974,784 A | 11/1999 | Feldman |
| 6,951,099 B2 * | 10/2005 | Dickau ..................... F01N 3/05 422/174 |
| 8,017,085 B2 * | 9/2011 | Fernandes, Jr. .... B01D 46/2422 422/179 |
| 8,186,058 B2 | 5/2012 | Merry |
| 8,356,639 B2 | 1/2013 | Merry |

(Continued)

FOREIGN PATENT DOCUMENTS

DE 102011121510 A1 6/2012
WO 2006024010 A2 3/2006

OTHER PUBLICATIONS

International Search Report, dated Mar. 13, 2017 (PCT/US2016/067406).

*Primary Examiner* — Binh Q Tran
(74) *Attorney, Agent, or Firm* — Robert L. Stearns; Dickinson Wright, PLLC

(57) ABSTRACT

The heat shield assembly includes an inner-most layer that is directly engagable with an exhaust component and is of a non-ceramic material with a first heat capacity and a first thermal conductivity. The heat shield assembly additionally includes an insulating layer that surrounds the inner-most layer and is of a material that has a second heat capacity which is lower than the first heat capacity and has a second thermal conductivity which is lower than the first thermal conductivity. The direct engagement of the inner-most layer with the exhaust component allows heat to be easily transferred between the exhaust component and the inner-most layer.

15 Claims, 4 Drawing Sheets

(56) References Cited

U.S. PATENT DOCUMENTS

| | | |
|---|---|---|
| 8,522,828 B2 | 9/2013 | Merry |
| 8,539,986 B2 | 9/2013 | Kroll et al. |
| 9,464,558 B2 * | 10/2016 | Tobben ................ F01N 3/0253 |
| 2007/0098954 A1 | 5/2007 | Kozerski |
| 2012/0103457 A1 | 5/2012 | Kroll et al. |
| 2013/0263574 A1 * | 10/2013 | Levin ........................ F01N 5/02 |
| | | 60/273 |
| 2014/0065331 A1 | 3/2014 | Ridolfi |
| 2015/0056881 A1 * | 2/2015 | Zhang ....................... B32B 5/00 |
| | | 442/268 |

\* cited by examiner

HEAT SHIELD ASSEMBLY FOR AN EXHAUST SYSTEM

BACKGROUND OF THE INVENTION

1. Technical Field

This invention relates generally to heat shield assemblies for vehicle exhaust systems.

2. Related Art

Vehicles with internal combustion engines typically include an exhaust system with a plurality of exhaust pipes, a catalytic converter, a muffler and (sometimes) a turbocharger. All of these components operate most efficiently at high temperatures. For example, the exhaust system typically is responsible for the oxidation of unburned hydrocarbons in the exhaust gas from the combustion process.

In order to protect other vehicle components from the heat of the exhaust gasses, most exhaust systems include one or more heat shields which encapsulate one or more of the components in the exhaust system. Typical heat shield assemblies are made substantially entirely of one or more insulating materials with very low thermal conductivities in order to directly insulate the exhaust components to maximizing the heat retained in the exhaust components to optimize the oxidation of unburned hydrocarbons in the exhaust gas from the combustion process.

SUMMARY OF THE INVENTION AND ADVANTAGES

One aspect of the present invention provides for a heat shield assembly for an exhaust system of an internal combustion engine of a vehicle. The heat shield assembly includes an inner-most layer that is directly engagable with an exhaust component and is of a non-ceramic material with a first heat capacity and a first thermal conductivity. The heat shield assembly additionally includes an insulating layer that surrounds the inner-most layer and is of a material that has a second heat capacity which is lower than the first heat capacity and has a second thermal conductivity which is lower than the first thermal conductivity. The direct engagement of the inner-most layer with the exhaust component allows heat to be easily transferred between the exhaust component and the inner-most layer.

The heat shield assembly is advantageous because, due to the high heat capacity and thermal conductivity, heat is very efficiently conducted between the exhaust component and the inner-most layer. As such, when the internal combustion engine is cold started with all components at an ambient temperature, the exhaust pipe warms relatively slowly because some of the heat from exhaust gasses travelling through the exhaust pipe is transferred into the inner-most layer. This protects the exhaust pipe from stresses due to rapid temperature change that could damage the exhaust component. Additionally, the high heat capacity and thermal conductivity of the inner-most layer allows the inner-most layer to trap a large amount of heat during operation of the engine and to return that heat back to the exhaust pipe after the engine has stopped operating, thereby reducing the rate at which the exhaust component cools. In addition to protecting the exhaust pipe from stresses from rapid temperature change, this also has the effect of keeping the exhaust pipe closer to an optimal operating temperature for if the internal combustion engine begins operation again in a short period. For example, if a driver of the vehicle turns the engine off while he or she goes into a store, the exhaust pipe will be closer to its optimal operating temperature when he or she restarts the engine. This may have the effect of reducing pollutants that are emitted by the exhaust system and also improving the performance of the engine during the time that exhaust pipe would otherwise be warming up to its optimal operating temperature.

According to another aspect of the present invention, the inner-most layer is made of two pieces.

According to yet another aspect of the present invention, the insulating layer is made of two pieces.

According to still another aspect of the present invention, the heat shield assembly further includes an outer shell that surround the inner-most and insulating layers for protecting the inner-most and insulating layers.

According to another aspect of the present invention, the outer shield is made of two pieces.

According to yet another aspect of the present invention, the two pieces of the outer shell are joined together by a weld seam.

According to still another aspect of the present invention, the weld seam joins the two pieces of the outer shell together at radially extending flanges on the pieces of the outer shell.

According to a further aspect of the present invention, the outer shell extends longitudinally past the inner-most and insulating layers in both longitudinal directions.

According to yet another aspect of the present invention, adjacent each longitudinal end, the outer shell tapers radially inwardly for directly contacting the exhaust component.

Another aspect of the present invention is related to an exhaust assembly for a vehicle. The exhaust assembly includes an exhaust component, such as an exhaust pipe, and a heat shield assembly which includes an inner-most layer and an insulating layer. The inner-most layer is in direct engagement with the exhaust component and is made of a non-ceramic material which has a first heat capacity and a first thermal conductivity for receiving and retaining heat from the exhaust component during operation of the internal combustion engine and for transferring heat back to the exhaust component after operation of the internal combustion engine has stopped. The insulating layer surrounds the inner-most layer and is of a material that has a second heat capacity that is lower than the first heat capacity and has a second thermal conductivity which is lower than the first thermal conductivity for insulating the exhaust component and the inner-most layer from another vehicle component.

BRIEF DESCRIPTION OF THE DRAWINGS

These and other aspects, features and advantages of the invention will become more readily appreciated when considered in connection with the following detailed description of presently preferred embodiments and best mode, appended claims and accompanying drawings, in which:

DETAILED DESCRIPTION OF PRESENTLY PREFERRED EMBODIMENTS

Figure 1:
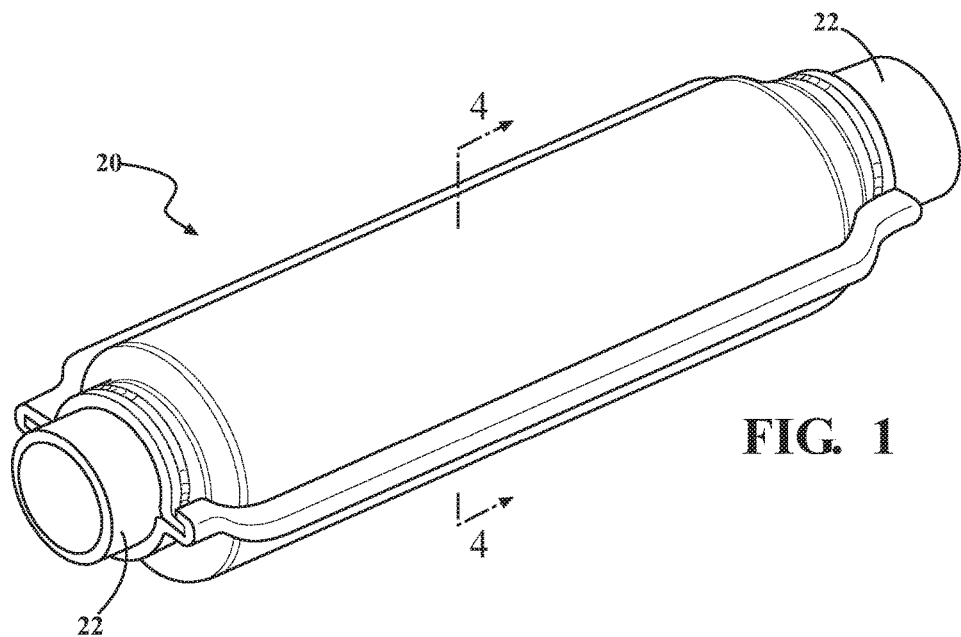
FIG. 1 is a perspective view of an exhaust component in the form of an exhaust pipe with an exemplary embodiment of a heat sink assembly encasing a portion of a longitudinal length of the exhaust pipe.
Figure 2:
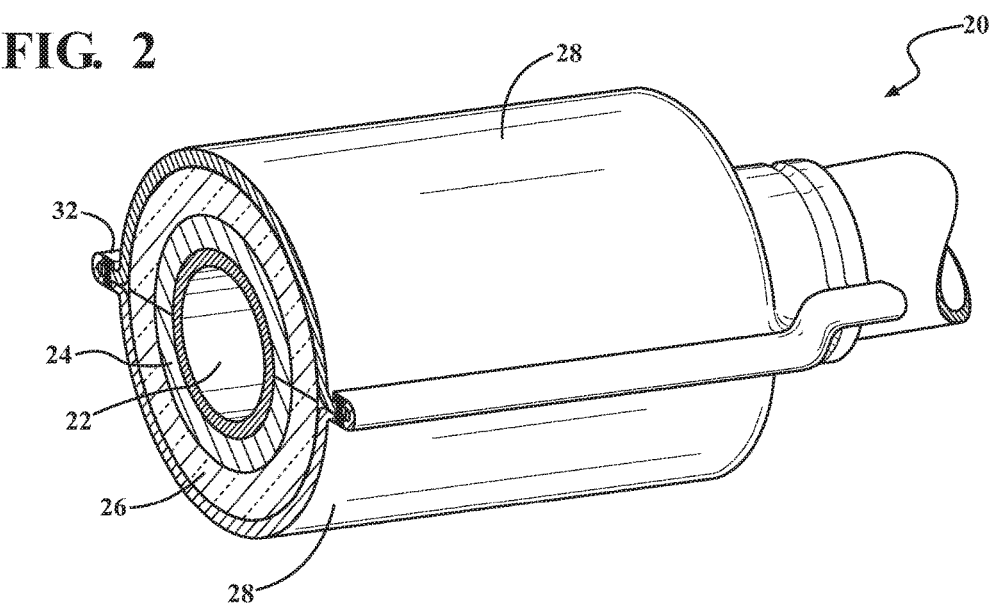
FIG. 2 is a sectional and perspective view of the exhaust pipe and the heat sink assembly.

Referring to the Figures, wherein like numerals indicate corresponding parts throughout the several views, an exhaust component including a heat shield assembly 20 for use in a vehicle with an internal combustion engine (not shown) is generally shown in FIG. 1. The exemplary exhaust component is an exhaust pipe 22 for conveying exhaust gasses from an exhaust manifold of the engine to the ambient air via a tail pipe. However, it should be appreciated that heat shield assembly 20 could be used in conjunction with other types of exhaust components, such as a catalytic converter, a turbocharger or a muffler.

The exemplary embodiment of the heat shield assembly 20 includes three distinct and separately formed layers which all surround or encapsulate a portion of the length of the exhaust pipe 22. A first of the three layers is an inner-most layer 24 which is in direct, surface-to-surface contact with the exhaust pipe 22 for directly transferring heat through conduction between the exhaust pipe 22 and the inner-most layer 24.

The inner-most layer 24 is made of a first material which has a first heat capacity (also known as specific heat) and a first thermal conductivity. The first heat capacity and the first thermal conductivity of the non-ceramic material are both relatively high. Due to the high heat capacity and thermal conductivity, heat is very efficiently conducted between the exhaust component and the inner-most layer 24. As such, when the internal combustion engine is cold started with all components at an ambient temperature, the exhaust pipe 22 warms relatively slowly because some of the heat from exhaust gasses travelling through the exhaust pipe 22 is transferred into the inner-most layer 24. This protects the exhaust pipe 22 from damage that could occur from heating up too rapidly.

Additionally, the high heat capacity and thermal conductivity of the inner-most layer 24 allows the inner-most layer 24 to return heat back to the exhaust pipe 22 after the engine has stopped operating to reduce the rate at which the exhaust component cools. In addition to protecting the exhaust pipe 22 from damage from cooling too quickly, this also has the effect of keeping the exhaust pipe 22 closer to an optimal operating temperature for if the internal combustion engine begins operation again in a short period. For example, if a driver of the vehicle turns the engine off while he or she goes into a store, the exhaust pipe 22 will be closer to its optimal operating temperature when he or she restarts the engine. This may have the effect of reducing pollutants that are emitted by the exhaust system and also improving the performance of the engine during the time that exhaust pipe 22 would otherwise be warming up to its optimal operating temperature.

The inner-most layer 24 may be made of a material that is solid at normal ambient temperatures and which is liquid at normal operating temperatures of the exhaust pipe 22 for storing energy in the form of latent heat. Alternately, the inner-most layer 24 could be of a material that is solid throughout the operating temperature range of the exhaust pipe 22. Preferred materials for the inner-most layer 24 include salt paraffin; salt hydrates (such as pyrophosphate hydrates or eutectic salt hydrate mixtures, salts or eutectic salt mixtures); molten salts; metallic alloys; binary or ternary metallic compositions of Aluminum, Silicon, Copper, Magnesium or Nickel; and graphite compositions.

The heat shield assembly 20 also includes an insulating layer 26 which surrounds or encapsulates the inner-most layer 24. The insulating layer 26 is made of a material that has a second heat capacity which is lower than the first heat capacity of the inner-most layer 24 and with a second thermal conductivity which is lower than the first thermal conductivity of the inner-most layer 24. For example, the insulating layer 26 is may be made of high temperature insulation fiber-mats, wools, needle-mats, knit blankets or other composites or compositions of materials such as silica fiber, E-glass fiber, Alkaline Earth Silicate fibers, basalt fibers or other applicable high temperature resistant, low thermal conductivity insulation materials.

In operation, the insulating layer 26 restricts the escape of heat from the inner-most layer 24, thereby maximizing the transfer of heat between the exhaust pipe 22 and the inner-most layer 24 and also protecting other vehicle components from the heat emanating from the exhaust pipe 22.

The heat shield assembly 20 additionally includes an outer shell 28 which is made of a different material than the inner-most and insulating layers 24, 26 surrounds or encapsulates the insulating layer 26. The outer shell 28 may be made of any suitable material (such as metal or plastic) for protecting the exhaust pipe 22 and the inner-most and insulating layers 24, 26 from damage due to stones, water, dust, debris and other contaminants under a body of the vehicle.

Figure 3:
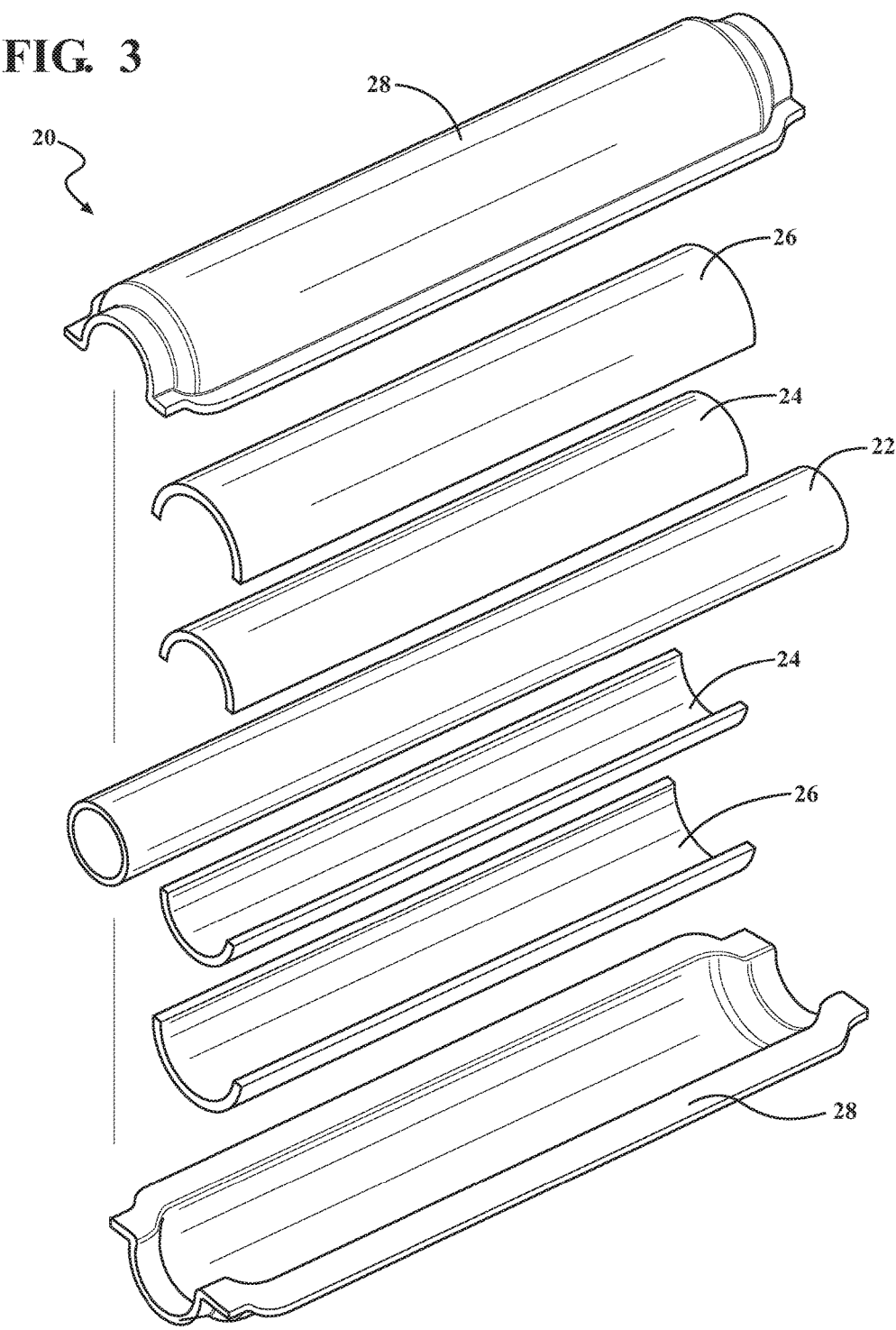
FIG. 3 is an exploded view of the exemplary embodiment heat sink assembly.
Figure 4:
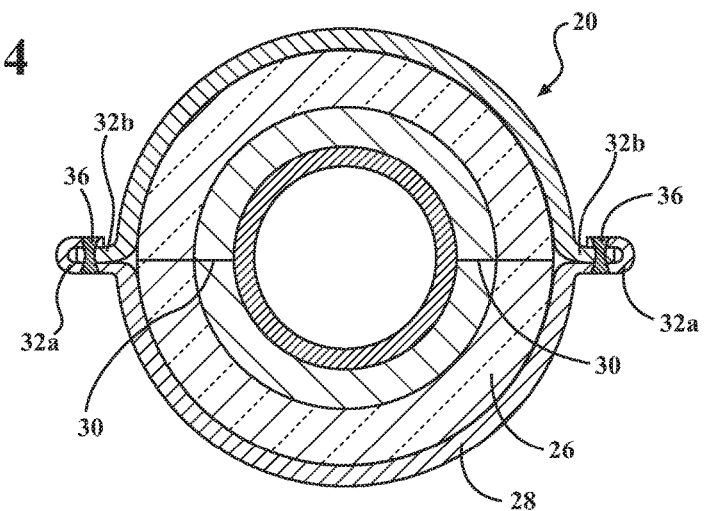
FIG. 4 is a cross-sectional view of the exhaust pipe and the exemplary embodiment of the heat sink assembly taken through Line 4-4 of FIG. 1.

As shown in FIG. 3, each of the inner-most layer 24, the insulating layer 26 and the outer shell 28 is made as two, generally half-cylindrically shaped pieces with diametrically spaced apart and longitudinally extending edges 30 and with interior surfaces that are curved. The interior surfaces of the pieces of the inner-most layer 24 are curved to match the curvature of the curvature of an outer surface of the tubular exhaust pipe 22. Referring now to FIG. 4, during assembly of the heat shield assembly 20, the two pieces of the inner-most layer 24 are brought into a nesting relationship with opposite sides of the exhaust pipe 22, and the longitudinally extending edges 30 are brought into contact with one another such that the inner-most layer 24 surrounds or encapsulates a portion of the exhaust pipe 22. This establishes a very large area of surface-to-surface contact between the exhaust pipe 22 and the inner-most layer 24 to promote the conduction of heat between the exhaust pipe 22 and the inner-most layer 24. The insulating layer 26 is joined with the inner-most layer 24 through a similar process to the above-described connection between the inner-most layer 24 and the exhaust pipe 22.

Figure 5:
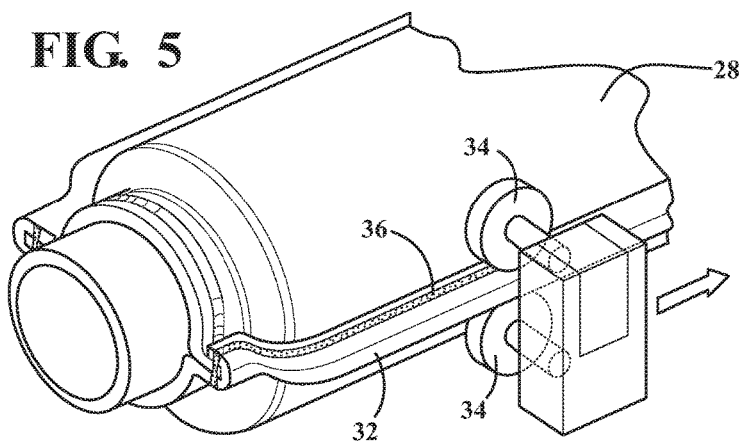
FIG. 5 is a perspective view showing a seam welding process being employed to weld two pieces of an outer shell of the exemplary heat sink assembly together.

Next, the two pieces of the outer shell 28 are locked together to trap the inner-most and insulating layers 24, 26. The exemplary pieces of the outer shell 28 have flanges 32*a*, 32*b* that extend both radially outwardly and longitudinally along the length of the outer shell 28. In the exemplary embodiment, the flanges 32*a*, 32*b* are deformed into a locking engagement with one another and then welded together to trap the inner-most and insulating layers 24, 26 around the exhaust pipe 22. Specifically, with reference to FIG. 5, the exemplary flanges 32*a*, 32*b* are welded together through seam welding by engaging opposite sides of the flanges 32*a*, 32*b* with a pair of electrically charged roller electrodes 34 and passing the length of the flanges 32*a*, 32*b* between the roller electrodes 34. The passage of current from one electrode 34, through the flanges 32 and to the other electrode 34 has the effect of heating portions of the flanges 32a, 32b to their melting point, thereby establishing a weld joint 36 (shown in FIG. 4) between the flanges 32a, 32b upon cooling. Seam welding has been found to be a particularly cost effective means to establish a reliable connection around the inner-most and insulating layers 24, 26.

Figure 6:
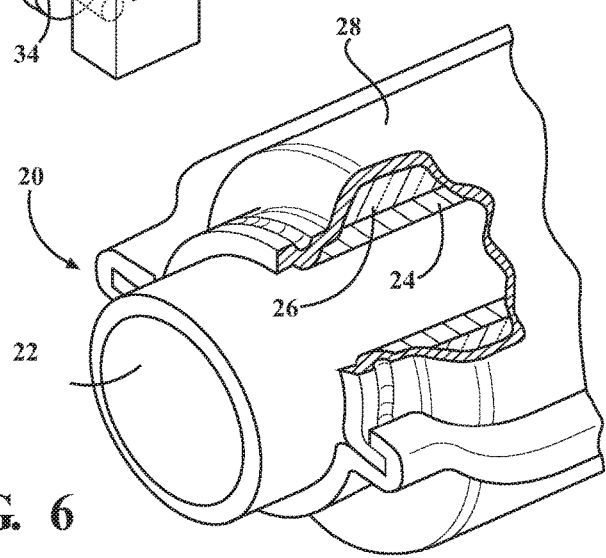
FIG. 6 is an enlarged view of one longitudinal end of the exemplary embodiment of the heat sink assembly around the exhaust pipe.

As shown in FIG. 6, at each of the longitudinal ends of the heat shield assembly 20, the outer shell 28 extends longitudinal past the neighboring ends of the inner-most and insulating layers 24, 26 and tapers radially inwardly to directly contact the exhaust pipe 22. The exemplary outer shell 28 is also mechanically deformed to establish a gas and fluid tight seal between the outer shell 28 and the exhaust pipe 22. Additionally, an adhesive or coating could be applied to establish the gas and fluid tight seals between the longitudinal ends of the outer shell 28 and the exhaust pipe 22.

Figure 7:
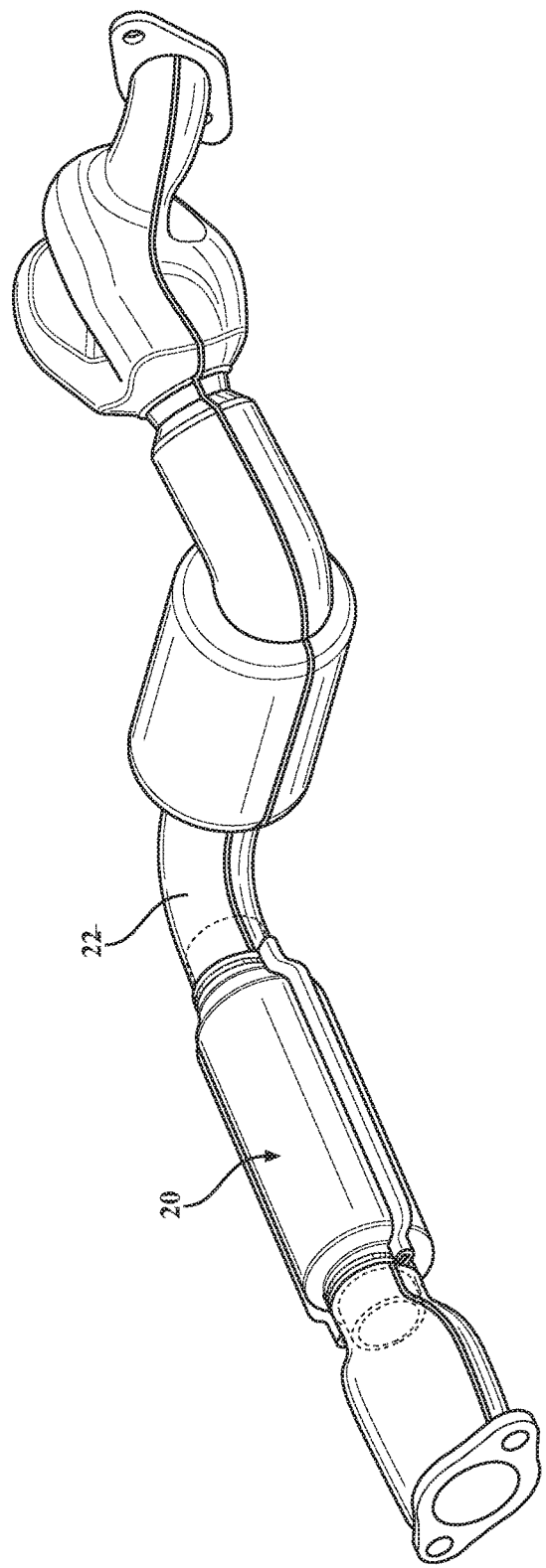
FIG. 7 is a perspective view of a heat shield covering a turbo charger, a catalytic converter and a portion of an exhaust pipe in an exemplary vehicle exhaust assembly.

FIG. 7 shows the exemplary embodiment of the heat shield assembly 20 as installed over a plurality of components in an exemplary exhaust system for a vehicle. In this embodiment, the heat shield assembly 20 surrounds a turbo charger, a catalytic converter and a portion of an exhaust pipe.

Obviously, many modifications and variations of the present invention are possible in light of the above teachings. It is, therefore, to be understood that within the scope of the appended claims, the invention may be practiced otherwise than as specifically described.

What is claimed is:

1. A heat shield assembly for an exhaust system of an internal combustion engine of a vehicle, comprising:
   an inner-most layer that is directly engagable with an exhaust component and is of a non-ceramic material with a first heat capacity and a first thermal conductivity for receiving and retaining heat from the exhaust component during operation of the internal combustion engine and for transferring heat back to the exhaust component after operation of the internal combustion engine has stopped; and
   an insulating layer surrounding and in surface-to-surface contact with said inner-most layer and being of a material that has a second heat capacity that is lower than said first heat capacity and a second thermal conductivity that is lower than said first thermal conductivity for insulating the exhaust component and said inner-most layer from another vehicle component.

2. The heat shield assembly as set forth in claim 1 wherein said inner-most layer is of two pieces.

3. The heat shield assembly as set forth in claim 1 wherein said insulating layer is made of two pieces wherein each piece of said insulating layer less than fully encircles said inner-most layer and wherein said two pieces of said insulating layer are in contact with one another along diametrically opposed joining surfaces.

4. The heat shield assembly as set forth in claim 1 further including an outer shell that surrounds said inner-most and insulating layers for protecting said inner-most and insulating layers.

5. The heat shield assembly as set forth in claim 4 wherein said outer shell is made of two pieces.

6. The heat shield assembly as set forth in claim 5 wherein said two pieces of said outer shell are joined together at a weld seam.

7. The heat shield assembly as set forth in claim 6 wherein said weld seam joins said two pieces of said outer shell together at radially extending flanges on said pieces of said outer shell.

8. The heat shield assembly as set forth in claim 4 wherein said outer shell extends longitudinally past said inner-most and insulating layers in both longitudinal directions.

9. The heat shield assembly as set forth in claim 8 wherein adjacent each longitudinal end, said outer shell tapers radially inwardly for directly contacting the exhaust component.

10. An exhaust assembly for a vehicle, comprising:
    an exhaust component;
    a heat shield assembly including an inner-most layer, an insulating layer;
    said inner-most layer directly engaging said exhaust component and being of a non-ceramic material with a first heat capacity and a first thermal conductivity for receiving and retaining heat from said exhaust component during operation of the internal combustion engine and for transferring heat back to said exhaust component after operation of the internal combustion engine has stopped; and
    an insulating layer in surface-to-surface contact with and surrounding said inner-most layer and being of a material that has a second heat capacity that is lower than said first heat capacity and a second thermal conductivity that is lower than said first thermal conductivity for insulating said exhaust component and said inner-most layer from another vehicle component.

11. The exhaust assembly as set forth in claim 10 wherein said exhaust component is an exhaust pipe.

12. The exhaust assembly as set forth in claim 1 further including an outer shell that surrounds said inner-most and insulating layers for protecting said inner-most and insulating layers.

13. The exhaust assembly as set forth in claim 4 wherein said outer shell is made of two pieces.

14. The exhaust assembly as set forth in claim 5 wherein said two pieces of said outer shell are joined together at a weld seam.

15. The exhaust assembly as set forth in claim 4 wherein said outer shell extends longitudinally past said inner-most and insulating layers in both longitudinal directions.

* * * * *